United States Patent [19]

Hand

[11] 3,854,095

[45] Dec. 10, 1974

[54] INTERSTAGE POLE SHIFTING NETWORK

[75] Inventor: Wilfred Leslie Hand, Clarence, N.Y.

[73] Assignee: GTE Sylvania Incorporated, Stamford, Conn.

[22] Filed: Apr. 9, 1973

[21] Appl. No.: 349,557

[52] U.S. Cl. .......................... 325/490, 178/DIG. 19
[51] Int. Cl. .............................................. H04b 1/16
[58] Field of Search ........... 325/319, 330, 331, 387, 325/427, 428, 490, 489; 333/17, 18 R; 178/DIG. 19

[56] References Cited

UNITED STATES PATENTS

| | | | |
|---|---|---|---|
| 2,646,471 | 7/1953 | Cheney | 178/DIG. 19 |
| 2,774,866 | 12/1956 | Burger | 178/DIG. 19 |
| 2,879,344 | 3/1959 | Chatterton, Jr. | 325/427 |
| 2,901,537 | 8/1959 | Comninos | 178/DIG. 19 |
| 3,389,216 | 6/1968 | Sennik | 178/DIG. 19 |

FOREIGN PATENTS OR APPLICATIONS

| | | | |
|---|---|---|---|
| 252,136 | 1/1963 | Australia | 178/DIG. 19 |

*Primary Examiner*—Benedict V. Safourek
*Assistant Examiner*—Jin F. Ng
*Attorney, Agent, or Firm*—Norman J. O'Malley; Thomas H. Buffton; Cyril A. Krenzer

[57] ABSTRACT

An interstage pole shifting network for a signal receiver includes a parallel tuned circuit coupling a potential source to the junction of interconnected IC broad band amplifier stages with an impedance means including a PIN diode coupling the junction of the interconnected IC broad band amplifiers to circuit ground and to an AGC signal source whereby a reduction in received signal strength causes a reduction in bandwidth, an increase in magnitude, and an increased frequency center of a bandpass characteristic curve.

9 Claims, 3 Drawing Figures

INTERSTAGE POLE SHIFTING NETWORK

CROSS-REFERENCE TO RELATED APPLICATIONS

An "AFC System for Television Receiver" by C. B. Neal et al., U.S. Pat. No. 3,499,981 and "Television Receiver Intermediate Frequency Amplifier Circuitry" by Karol Siwko, U.S. Pat. No. 3,706,846 both assigned to the assignee of the present invention.

BACKGROUND OF THE INVENTION

Signal receivers commonly employ intermediate frequency (IF) amplifier stages for coupling received signals to a detector stage. Also, an automatic gain control (AGC) stage is usually employed to feed back positive or negative-going signals varying in magnitude in accordance with received signal variations to cancel or correct such undesired IF signal deviations.

Further, it is a common practice to provide circuitry responsive to signals from the AGC stage for altering the bandwidth or bandpass characteristics of the IF stages. Ordinarily, the system operates in a manner such that a decrease in signal strength is utilized to decrease the width, increase the Q or magnitude, and shift the frequency center of the bandpass characteristic of the IF amplifier stages.

Additionally, it is a common practice to effect the abovementioned alterations in bandpass characteristics by altering the characteristics of one or more of the IF amplifier stages. In other words, the active devices of the IF amplifier stages are altered such that the bandpass characteristics of the signal receiver are altered.

However, it has been found that the abovementioned altering capabilities are conspicuously absent when the signal receiver employs IC broad band amplifier stages which are fixed rather than alterable. In other words, IC broad band amplifier systems utilizing fixed gain blocks wherein active devices are unavailable present a serious problem insofar as desired alteration in bandpass characteristics are concerned as compared with previous readily available active devices in the IF stages.

OBJECTS AND SUMMARY OF THE INVENTION

An object of the present invention is to provide enhanced bandpass characteristics in a signal receiver employing IC broad band amplifier stages. Another object of the invention is to improve reproduction capabilities of a signal receiver in response to both relatively strong and relatively weak received signals. Still another object of the invention is to narrow the band width and increase the Q to provide an improved bandpass characteristic when a received signal decreases in magnitude.

These and other objects, advantages and capabilities are achieved in one aspect of the invention by a signal receiver having a pair of interconnected IC broad band amplifier stages coupled to a detector stage providing signals to an AGC means with a parallel tuned circuit interconnecting a potential source and the junction of the interconnected IC broad band amplifier stages and an impedance means including a PIN diode coupling the junction of the IC broad band amplifier stages to a potential reference level and to the AGC means.

DESCRIPTION OF THE PREFERRED EMBODIMENT

Figures 1, 2, 3:
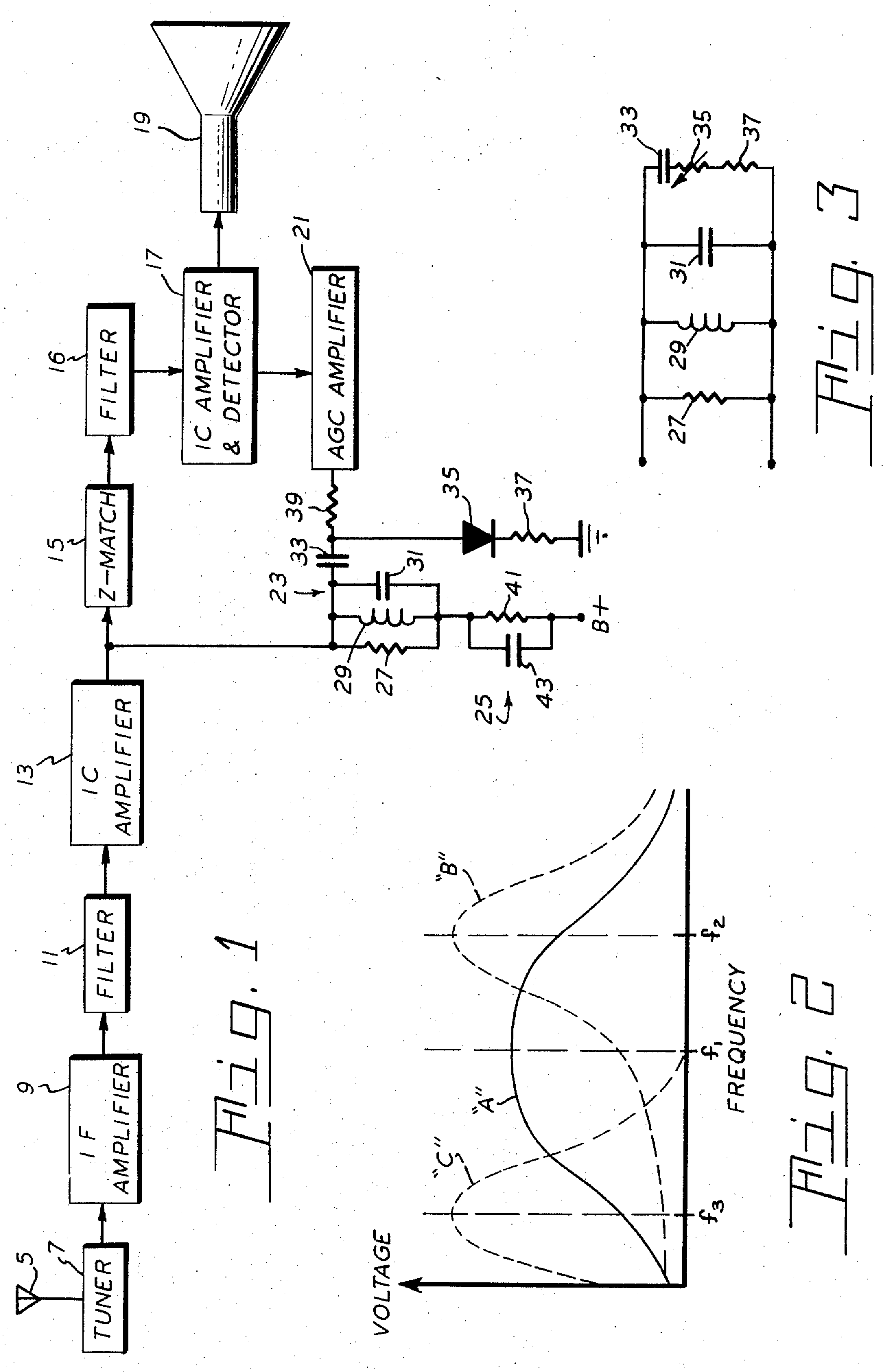
FIG. 1 is a signal receiver employing one embodiment of the invention.
FIG. 2 is a diagram illustrating the bandpass characteristics of the embodiment of FIG. 1.
FIG. 3 illustrates equivalent circuitry suitable for explaining the embodiment of FIG. 1.

For a better understanding of the present invention, together with other and further objects, advantages and capabilities thereof, reference is made to the following disclosure and appended claims in connection with the accompanying drawings.

Referring to the drawings, FIG. 1 illustrates a signal receiver in the form of a television receiver, for example. Herein, a broadcast signal is intercepted by an antenna 5 and applied to a tuner stage 7. The tuner stage 7 converts the received RF signal to an intermediate frequency (IF) signal which is applied to a first IF amplifier 9 stage.

The IF signal from the first IF amplifier 9 is applied via a filter stage 11 to a second IF amplifier stage 13 which is in the form of a fixed gain block or IC broad band amplifier. The second IF amplifier stage 13 is coupled by an impedance matching network 15 to a second filter 16 and to an amplifier detector stage 17 which may also be in the form of an IC broad band amplifier and detector. The IF amplifier and detector stage 17 provides a detected output signal which is applied to a cathode ray tube 19 and to an automatic gain control (AGC) stage 21.

The AGC stage 21, which may be gated and of any one of a number of well known forms, provides an output signal representative of received signal strength which is applied to a pole shifting network 23 coupled to the junction of the IC broad band amplifier stage 13 and impedance network 15. A bias network 25, in this instance, couples the pole shifting network 23 to a potential source B+.

The pole shifting network 23 includes a parallel coupled resistor 27, inductor 29, and capacitor 31 connected to a potential source B+ via the bias network 25 and to the junction of the IC broad band amplifier stage 13 and impedance network 15. A capacitor 33 connects the parallel coupled resistor 27, inductor 29, and capacitor 31 to a series connected PIN diode 35 and resistor 37 which are, in turn connected to circuit ground. Also, the junction of the capacitor 33 and PIN diode 35 is connected by a resistor 39 to the AGC amplifier stage 21. Moreover, the bias network 25 may be in the form of a parallel coupled resistor 41 and capacitor 43.

Generally, the above-described pole shifting network 23 provides a broad band response tuned to a given frequency when the input from the AGC circuitry represents a minimum gain in the IF amplifier stages or receipt of a maximum signal strength. Thus, curve "A" of FIG. 2 serves to illustrate the desired relatively low Q bandpass characteristics for a relatively strong received signal tuned to a given center frequency "$f_1$."

However, a relatively weak received signal is accompanied by a maximum gain of the IF amplifier stages. Thereupon the input from the AGC stage 21 causes a shift in tuning to a frequency "$f_2$" of FIG. 2 along with a narrowing of the bandwidth and an increase in magnitude as can be seen in curve "B." Thus, a relatively weak received signal effects a shift in center frequency response, a decrese in bandwidth, and an increase in response magnitude or "Q" of the bandpass characteristic.

Further, it is known that the usual diode type semiconductor provides a switch type operation wherein the resistance value changes suddenly and in a relatively large amount with an increase in direct current flow therethrough. However, the so-called PIN diode is usually defined as a diode having an intrinsic region sandwiched between the P-doped and N-doped silicon layers and has the characteristic of a gradually falling or decreasing resistance value with increased current flow therethrough. Thus, the PIN diode may be represented as an adjustable resistor at RF and IF frequencies above 10 MHz and is ideally suited for attenuation type controls.

As to operation of the above-described pole shifting network 23, reference is made to the equivalent circuitry of FIG. 3. Assuming a current flow, 100 *ua* for example, from the AGC amplifier stage 21 through the resistor 39 into the PIN diode 35 and the resistor 37 to circuit ground. The total resistance of the diode 35 and resistor 37 would be of an amount sufficient to cause the combined capacitor 33, diode 35, and resistor 37 to appear as a very low Q circuit ($A = X_c/R_s$) where ($R_s$ = total series resistance) in shunt with the tuned circuit consisting of resistor 27, inductor 29, and capacitor 31. Thus, the total circuitry would shift lower in Q and lower in frequency to provide a response illustrated as curve "A" of FIG. 2 centered at a frequency $f_1$.

As the current flow is decreased, in response to a weaker received signal and an increased response from the AGC stage 21, the resistance value of the PIN diode 35 increases and the Q of the circuitry increases. Thus, the total circuitry exhibits an increase in Q, an increased center frequency $f_2$ of curve "B," and an increased magnitude of the bandpass characteristic.

Additionally, it should be noted that the fixed resistor 37 is important in order to prevent an undesired lowering of the tuned center frequency if current flow through the PIN diode 35 were increased to excessively high levels. Without the presence of the resistor 37, the capacitor 33 would, essentially, be placed in parallel with the capacitor 31. Thus, the resonant frequency would be undesirably shifted to a center frequency of $f_3$ as illustrated by curve "C" of FIG. 2.

As an example but in no way limiting the present structure, the following component values are appropriate:

R27 — 5.6 k ohms
L29 — 0.807 $\mu$Hy
C31 — 15 p.f.
C33 — 10 p.f.
R39 — 120 *k* ohms
PIN diode 35 — BA 379, HP 3,080
R37 — 330 Ω

Thus, there has been provided a unique interstage pole shifting network especially suitable for a signal receiver employing IC broadband amplifier stages which have substantially fixed values. The network not only provides an enhanced receiver capability for both relatively strong and relatively weak received signals but, more importantly, accomplishes these features when the amplifier stages are of a fixed rather than alterable construction.

While there has been shown and described what is at present considered the preferred embodiment of the invention, it will be obvious to those skilled in the art that various changes and modifications may be made therein without departing from the invention as defined by the appended claims.

What is claimed is:

1. In a signal receiver employing an integrated circuit (IC) having a pair of broad band amplifier stages connected by an impedance matching network with a junction therebetween and coupling a tuner stage to a detector stage with an automatic gain control (AGC) means coupled to the detector stage, an interstage pole shifting network comprising:

a potential source;

tuned circuit means coupling said potential source to said junction of said pair of IC broad band amplifier stages; and impedance means including a series connected capacitor, pin diode, and resistor AC coupling said junction of said pair of IC broad band amplifier stages to a potential reference level, said capacitor and pin diode having a junction therebetween coupled to said AGC means, said pole shifting network effecting a shift from a broad band, low Q, minimum gain at a center frequency $f_1$ to a narrow band, high Q, maximum gain at a center frequency $f_2$ upon a signal strength shift from maximum to minimum.

2. The interstage pole shifting network of claim 1 wherein said tuned circuit means is in the form of a parallel coupled inductor, capacitor, and resistor.

3. The interstage pole shifting network of claim 1 including a bias developing means disposed intermediate said tuned circuit means and said potential source.

4. The interstage pole shifting network of claim 3 wherein said bias developing means is in the form of a parallel connected capacitor and resistor.

5. An interstage pole shifting network for a signal receiver having a pair of integrated circuit (IC) broad band amplifier stages, with a junction therebetween and interconnected by an impedance matching network, coupling a tuner stage to a detector stage with an automatic gain control (AGC) means coupled to the detector stage comprising:

a potential source;

a parallel coupled tuned circuit means coupling said potential source to said junction of said pair of impedance matching network connected IC broad band amplifier stages; and impedance means including a capacitor coupling said junction of said pair of IC broad band amplifier stages connected by an impedance matching network to said AGC means with said capacitor connected via a PIN diode to a potential reference level to effect a shift in band pass characteristics, said network shifting from a broad band, low Q, minimum gain, at a center frequency $f_1$ to a narrow band, high Q, maximum gain, at a center frequency $f_2$ in response to a shift in signal strength from maximum to minimum.

6. The interstage pole shifting network of claim 5 wherein said parallel coupled tuned circuit means includes an inductor, capacitor, and resistor.

7. The interstage pole shifting network of claim 5 wherein said impedance means includes a series connected capacitor, pin diode, and resistor.

8. The interstage pole shifting network of claim 5 wherein said impedance means includes a series connected capacitor and pin diode with a junction therebetween coupled to said AGC means.

9. The interstage pole shifting network of claim 5 including a bias development means coupling said parallel coupled tuned circuit means to said potential source.

* * * * *